United States Patent Office 3,212,671
Patented Oct. 19, 1965

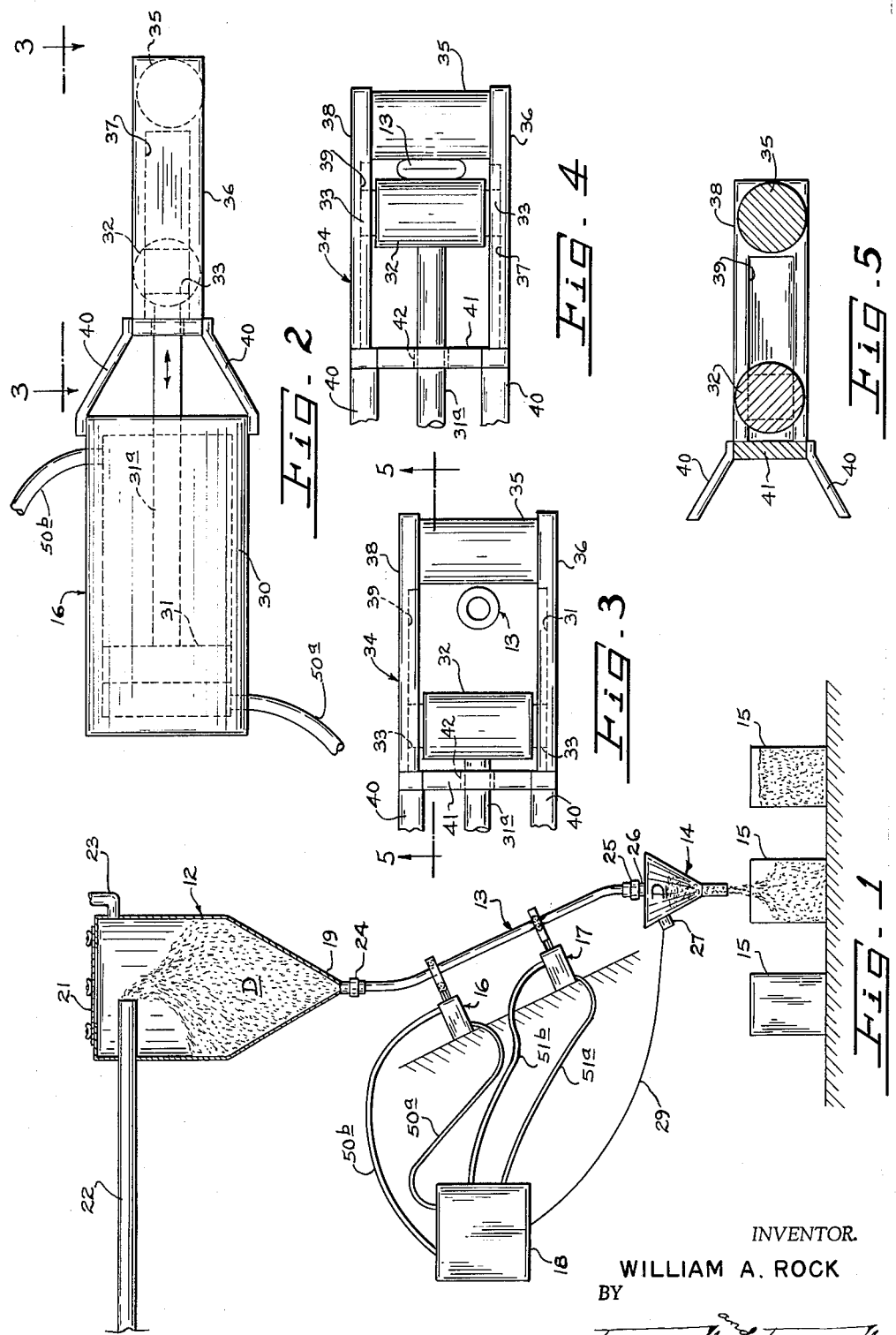

3,212,671
METHOD AND SYSTEM FOR DISPENSING HYGROSCOPIC MATERIALS FROM A VACUUM CONTAINER
William A. Rock, Castro Valley, Calif., assignor to Gerber Products Company, Fremont, Mich.
Filed Jan. 15, 1964, Ser. No. 337,854
4 Claims. (Cl. 222—1)

This invention relates to a valve which can be used to control the flow of particles, particularly hygroscopic pulverant material such as dry powdered or granular food. More particularly, this invention relates to an air lock valve which can be used to control the flow of dried food from a sealed vacuum processing system to a packaging station having a higher ambient atmospheric pressure.

Dried food particles have a general tendency to adsorb moisture and as a result are generally treated in a vacuum atmosphere which includes some inert gas, such as nitrogen. In order to make this dried food processing economically feasible, the system has to be sealed, especially at the final drying stage, in order to prevent the moist air from permeating the mixture and causing the powder or granules to cake or consolidate into larger chunks. If any of the common type valves were to be used to release the dried food from the sealed vacuum chamber, two major problems arise. First of all, the relatively positive pressure of the atmosphere causes air to rush into or enter the chamber where it permeates the dried food particles with moisture causing them to cake or consolidate. As a result, the material is not only undesirably moistened, but it may eventually become difficult if not impossible to remove caked or consolidated material through the relatively small opening of the valve. Another problem in using the conventional valve is that the inrushing flow of moist air is relatively continuous and tends to retard the outward flow of the dry material thereby impeding removal of material from the vacuum system.

A valve which has been used to partially overcome these problems is the rotary vane type which is somewhat similar to a revolving door or paddle wheels rotatably mounted across the outlet passageway. This type of valve does, however, have its problems in that it is very difficult to obtain a good seal between the vane edge and the vane chamber. Thus, there is a tendency for a certain amount of air leakage back past this valve. In addition, there is still the possibility that the moisture in the feedback air will cake or consolidate the dry food particles and eventually clog the valve outlet. And a third disadvantage is that these valves have many food trapping surfaces and are very difficult to clean as is frequently necessary or required by the public health requirements in food handling systems.

Accordingly, it is an object of this invention to solve the above problems in a simple and facile manner.

A more specific object of this invention is to provide a valve for handling dried food particles in which a resilient hose is connected to convey dried food particles between the food processing station and a second station, and in which a pair of spaced apart selectively actuated clamping means are connected to deformably pinch the hose at spaced apart points to intermittently release or convey quantities of food between the system and the second station.

Features and advantages of this pinch valve arrangement reside in the fact that dried food particles can be transferred from a negative pressure environment to a relatively positive pressure environment against an intermittently static backflow of air whereby the release of food is not continuously retarded by a dynamic air flow. Only a measured quantity of air fills the space evacuated by the released food particles so that when the pinch valve nearest the positive station is closed and the pinch valve nearest the negative station opened, only a small quantity of air enters the negative pressure station in a somewhat pulsing manner, thereby avoiding the problem of a continuous backflow of air.

An advantage of allowing the pulsing backflow of positive pressure air into the negative pressure chamber is that it tends to disrupt the dry food particles thereby breaking up any caked or consolidated chunks to greatly increase their flowability.

Still another object of this invention is to provide an improved air lock valve for handling dried particulate food in which the valve food conveying passageway is entirely smooth and free of food trapping surfaces.

Still another advantage of this air lock valve resides in the fact that the food process is made more economical by reducing the amount of air which enters the nitrogen filled vacuum chamber thereby greatly reducing the costs of maintaining the vacuum and repurifying the nitrogen for recirculation through the system.

Other objects, features, and advantages of this invention will become apparent upon reading the following detailed description and referring to the accompanying drawings in which:

FIG. 1 is a side elevational view of the pinch valve in combination with one type of food processing system in which it can be used;

FIG. 2 is an enlarged side elevational view of a pinch valve mechanism in which interior portions of the mechanism are illustrated as invisible edges;

FIG. 3 is a fragmentary enlarged top plan view of the pinch valve clamping mechanism illustrated in the valve open position;

FIG. 4 is a fragmentary top plan view of the pinch valve clamping mechanism of FIG. 3 illustrated in the valve closed position; and FIG. 5 is a cross-sectional side elevational view of the pinch valve clamping mechanism taken along the line 5—5 of FIG. 3.

Now referring to the system, as illustrated generally in FIG. 1, there is provided a representative sealed vacuum chamber 12 of a dry food processing system. A resilient collapsible hose 13 is connected at one end to the sealed vacuum chamber hopper outlet and at the other end to a funnel-shaped packaging line filler 14. Filler 14, in turn, deposits the food in containers 15 as they are conveyed underneath it. Upper and lower hose clamp valves 16 and 17 are selectively actuated by timer 18 to pinch close or collapse resilient hose 13 at two spaced apart locations in an alternate sequence which insures that at least one of the valves is always closed during any given time interval. Thus with the upper pinch valve 16 open and lower pinch valve 17 closed dry material will drop in the hose as far as the pinched closed lower location and can progress no further. In turn, moist air from the relatively positive pressure atmosphere cannot flow back upward into the vacuum chamber. Then, upper clamp valve 16 is closed to collapse the resilient hose shut at an upper location thereby entrapping a certain amount of dry material between the two collapsed shut locations. When upper clamp valve 16 is fully closed lower clamp 17 is released permitting the resilient hose at the lower location to resiliently spring back open aided by an initial surge or backflow of air. The entrapped dry material then falls to container filling funnel 14. After allowing sufficient time for entrapped material to drop, the lower hose clamping valve 17 is again closed to collapse the resilient hose passageway shut at the lower portion thereby entrapping a portion of static flowback air between the two pinched shut zones. In order to restart the valving cycle upper clamp valve 16 is again opened allowing an initial surge of air to flow toward vacuum chamber 12 thereby partially loosening the material and partially breaking any flakes or chunks which may have formed in the system. When relatively static air conditions exist, additional dry material drops down through hose 13 to the lower collapsed location and the above described valve cycle repeated.

With regard to the illustrated food processing line the vacuum chamber 12 and packaging filler 14 can be considered representative and are not drawn to scale. Vacuum chamber 12 includes generally a hopper 19 having an outlet at the lowermost point thereof. The vacuum chamber roof has a sealing door or plate 21 detachably secured to it to provide an air tight seal for the vacuum chamber. Particulate hygroscopic pulverant material is fed into the hollow interior of this vacuum chamber by means of the food conveying pipe 22 connected through the side wall thereof. A nitrogen atmosphere, under reduced pressure, is also carried into vacuum chamber 12 with the pulverant material to maintain the particles in a dried state. In order to maintain a reduced pressure in the chamber, a vacuum outlet 23 is also connected through the hopper wall wherein the nitrogen gas and any contaminant is continuously removed and may, as is conventional in these types of systems, be fed back through an exchanger where it is purified and thereafter reused.

Reference has heretofore been made to dried food particles and this should be understood to include particulate hygroscopic pulverant material such as powdered, granular, or flake-like particles. Since many of these food particles have the tendency to absorb moisture, it is necessary to prevent their exposure to the moist atmosphere. As is common with these particles, there is a tendency to absorb the moisture in the air causing the particles to cake or consolidate and as such could eventually block the lower outlet orifice in coupling 15. Thus, it is necessary to provide an outlet valve which conveys the particles to the packaging line B located in a relatively positive atmosphere without allowing substantial quantities of moist air to flow back through the line. In addition, it is necessary to reduce the dynamic air flowback into the chamber which could retard particle flow removal.

In order to attain these advantages, a collapsible hose 13 made of a flexible and resilient plastic or rubber-like material is connected between the hopper and the packaging line funnel 14. The hose passageway is sufficiently large to carry a substantial quantity of the dried food particles. In addition, the hose wall must be sufficiently thick so that the resilient character of the material will not permit it to collapse when a negative pressure is created within the hose passageway. It is also necessary that the hose wall be thick enough to provide sufficient resiliency to spring the hose back into its normal, round, open passageway shape as hose clamp valves 16 and 17 are opened as will be explained shortly. Resilient hose 13 also has upper couplings 24 and lower coupling 25 secured to each end. The upper coupling 24 is connected to the hopper outlet and provides a substantially air tight seal therewith. It should be understood that these are conventional couplings and can be the screw type, bayonet type or any other commercially available fitting. The lower hose coupling 25 is connected to the packaging line funnel 14 at inlet pipe 26 in an air tight sealing.

Now referring to the packaging line it should be noted that the packaging line funnel 14 can be in the form of a sealed unit having a single outlet drainpipe formed at the lower end thereof. Gravity exerted on particulate material contained within packaging line funnel 14 causes them to exit through this lower drainpipe and drop into containers or cans 15 carried on a conventional packaging line conveyor.

As illustrated in FIGS. 2-5, hose clamp valve 16 includes a pressure actuated cylinder ram 30 which reciprocally drives a cylindrical cross bar 32 in clamp frame 34. As this reciprocal bar 32 is guided along the guide slots 37 and 39 of guide rails 36 and 38, respectively, it can be moved closer to and away from the stationary cylindrical cross bar 35. As a result, the resilient hose 13 is collapsed or deformably pinched shut along a limited length to seal the food conveying passageway.

In detail, valve 16 includes a pressure actuated ram having a hollow cylindrical housing 30 with a piston 31 slidably mounted therein. This piston can have suitable packing or be of such closer tolerance that it effectively divides the interior of cylinder 30 into two separate variable volume chambers. Thus, as fluid is pumped or injected into either one of these variable volume chambers and removed from the other by means of the control lines 50a and 50b, piston 31 will be driven reciprocally within the chamber. This will cause the connected piston rod 31a to extend and retract through the aperture in the cylinder's end wall.

The guide frame 34 for relatively movable hose clamping cross bar members 32 and 35 is connected to the piston cylinder housing 30 by four spaced braces 40. These braces 40 are bent and welded or otherwise fastened at their ends to the guide frame 34 and the cylinder housing 30 thereby providing a rigid connection between them.

Guide frame 34 is in the form of a substantially rectangular open center structure including a pair of spaced apart guide rails 36 and 38 each having a guide slot 37 and 39, respectively, formed on the inner face thereof. In order to hold these two guide rails 36 and 38 in parallel spaced apart relationship a cross member 41, having a piston arm receiving aperture 42 formed therein, is interconnected between one end of each guide rail, such as by welding or other conventional fastening means. The other ends of each guide rails have a stationary cylindrical cross bar 35 connected between them, such as by welding, bolts, screws, or any other conventional fastening means.

The movable cylindrical hose clamping bar 32 has square ears or hubs 33 formed on each end wall. These hubs 33 are dimensioned to a tolerance so that they will freely slide within the guide slots 37 and 39. Thus, as piston arm 31a, which is connected to the movable cross bar 32, is extended and retracted, this cylindrical hose clamping cross bar 32 is moved toward and away from the relatively stationary hose clamping cross bar 35.

As illustrated in FIG. 3, a resilient hose 13 having a fluid conveying passageway is positioned in the open interior portion of the guide frame between the two hose clamping cross bars 32 and 35. With the bars 32 and 35 in the released position, as illustrated in FIG. 3, the dry food material is free to flow through the hose. When however, piston arm 31a extends the relatively movable hose clamping cross bar 32 moves toward the stationary bar 35 to deformably pinch resilient hose 13 so that the passageway is pinched off or collapsed, as illustrated in FIG. 4. Thus, a portion of hose 13 is sealed off for a short length therealong to effectively block the flow of all material and gases through the passageway.

It should be understood at this time that the lower hose clamping mechanism 17 which is illustrated generally in FIG. 1 is identical to the above described hose clamping structure 16 illustrated in FIGS. 2–5 and need not be described in detail.

Now referring to the details of the system's operation and function, it should be noted that the hose clamping mechanisms 16 and 17 are supported in spaced apart relationship so that they will clamp hose 13 at spaced apart zones. Considering the start of a valve cycle to be when both the upper and lower clamping valves 16 and 17 are actuated to collapse the hose passageway at two spaced apart locations, no food particles will flow within the hose. The upper hose clamping mechanism 16 is first released thereby allowing the dried food particles to fall to the lower pinched off zone. After a predetermined time interval the upper hose clamping mechanism 16 is again actuated to deformably pinch or seal the hose at the upper zone. As a result, a predetermined amount of food particles and reduced pressure atmosphere are entrapped in the hose length between the upper and lower collapsed zones. Next, the lowermost hose clamping mechanism 17 is released thereby opening the entrapped partial vacuum to the atmosphere and allowing a sudden pulsing surge of feedback air to enter through the packaging nozzle outlet. As a result, those particles contained in the packaging nozzle 14 and in the hose below the upper pinch of zone are momentarily disrupted thereby insuring that any particles which may have adhered together in chunks are broken up into small easily conveyed portions. In addition, this surge of feedback air which enters the hose 13 may tend to maintain the deformed portion of the hose clear of any particles which were pinchably entrapped thereat. Once equilibrium conditions exist the initial surge of feedback air ends and the particles entrapped within the hose length between the two hose clamping mechanisms are free to drop into the packaging line funnel 14. Then, after a predetermined time interval in which it is reasonably calculated that all particles have dropped free or have passed the lower pinch off location, the lower hose clamping mechanism 17 is again actuated to seal off the length of hose between the upper and lower clamping means. This results in a certain amount of relatively positive pressure air being entrapped between the collapsed location. Thereafter, the upper hose clamping mechanism 16 is released allowing the entrapped relatively positive pressure air to surge upward toward the negative pressure space of vacuum chamber A in a pulse-like manner. This pulse thereby operates to insure that any particles which may have adhered together are broken up to smaller easily conveyed pieces. Once this initial surge of feedback air ends, the dried particles are free to fall through the hose to the lower pinch off location. After a time interval in which it is reasonably calculated that the portion of hose positioned between the hose clamping mechanisms contains a sufficient amount of particulate material, the upper hose clamping mechanism 16 is again actuated to entrap the particles between the two pinch off zones. The lower hose clamping mechanism 17 is then released and the above described valve cycle repeated.

Although this valve sequencing can be done manually, it is preferable to provide some sort of an automatic control. Thus, a particle lever senser 27 can be connected to the side wall of packaging line funnel B to generate a signal when the particle level drops below a predetermined point. This level senser 27 can, of course, be pressure responsive device or any other conventional condition responsive device commercially available. Once the level drops below a certain point, a signal is fed back over the line 29 to the timing mechanism 18. This timing mechanism can also be of any conventional pneumatic or hydraulic type, such as those which include a timing disk or switch which is connected to operate a plurality of solenoids which are in turn adapted to open and close to supply the actuating energy lines 50a–50b and 51a–51b with a pressurized fluid in accordance with the above discussed predetermined timing sequence.

Although one embodiment of this invention has been described and illustrated for purposes of description it should be understood that changes can be made in the shapes and arrangements of parts and positions thereof without departing from the scope of the invention as defined in the appended claims.

What is claimed is:

1. A system for processing hygroscopic particulate material including: a sealed vacuum chamber for storing said hygroscopic material; means in fluid communication with said vacuum chamber for feeding said hygroscopic material into said chamber and for providing a gaseous atmosphere of reduced pressure to said chamber; outlet means connected to said chamber for removing gas from said chamber and for maintaining said reduced pressure; a resilient collapsible hose connected at one end to said vacuum chamber to receive said particulate material; first and second clamp valves operably connected to collapse said hose at first and second spaced locations to discharge said particulate material from said vacuum system into a relatively positive ambient pressure atmosphere while substantially preventing moist air from flowing through said hose from said ambient pressure atmosphere into said chamber; and valve control means connected to close and open said first and second valves alternately.

2. A vacuum system for processing dry particulate material comprising in combination: a vacuum chamber connected to receive particulate material and an inert gas at a reduced pressure; outlet means connected to said chamber for maintaining said gaseous reduced pressure; a resilient collapsible hose connected to said vacuum system conveying said dry particulate material from the vacuum system to a relatively positive ambient pressure by gravity feed; first and second pinch valves operably connected to collapse respectively said resilient hose at first and second locations to control the flow of said material; valve timing and actuating means connected to open and close said pinch valves in an alternating sequence so that at least one of said valves is closed at any given instant to allow particulate material to discharge from said valve system to said relatively positive ambient pressure while preventing moist air from said ambient pressure from flowing through said hose to said chamber.

3. A vacuum system as claimed in claim 2 wherein each of said first and second pinch valves comprises: a pair of reciprocal movable bar members adapted to pinch said hose therebetween at positions on spaced relationship along its longitudinal axis, and piston means connected to drive said bar members in a reciprocal manner.

4. A method for storing hygroscopic particulate material in a vacuum chamber at a reduced nitrogen pressure and for discharging it to a relatively positive ambient pressure atmosphere through a conduit selectively communicable with said vacuum chamber and said ambient atmosphere comprising the steps of: feeding said nitrogen and hygroscopic particulate material into a vacuum chamber, establishing fluid communication between said chamber and said conduit, discharging a predetermined portion of said particulate hygroscopic material into said conduit while preventing fluid communication between said portion of particulate material and said ambient atmosphere, interrupting fluid communication between said predetermined portion of particulate material and said vacuum chamber, and establishing fluid communication between said portion of particulate material and said relatively positive ambient pressure atmosphere, discharging said portion of particulate material into said positive ambient pressure atmosphere, whereby said material is discharged from said chamber into said ambient atmosphere while substantially preventing air moisture flow from said ambient atmosphere to said chamber.

References Cited by the Examiner

UNITED STATES PATENTS

| | | | |
|---|---|---|---|
| 2,599,978 | 6/52 | Davis et al. | 222—190 |
| 2,817,463 | 12/57 | Stokes | 222—442 |
| 2,895,653 | 7/59 | Giepen | 222—504 X |
| 3,012,701 | 12/61 | Weber | 222—450 X |

FOREIGN PATENTS

| | | |
|---|---|---|
| 217,641 | 3/57 | Australia. |
| 658,686 | 3/63 | Canada. |

LOUIS J. DEMBO, *Primary Examiner.*

RAPHAEL M. LUPO, *Examiner.*